Sept. 29, 1970 A. TURCZYN 3,531,782
THIN FILM KEEPERED MEMORY ELEMENT
Filed May 26, 1965
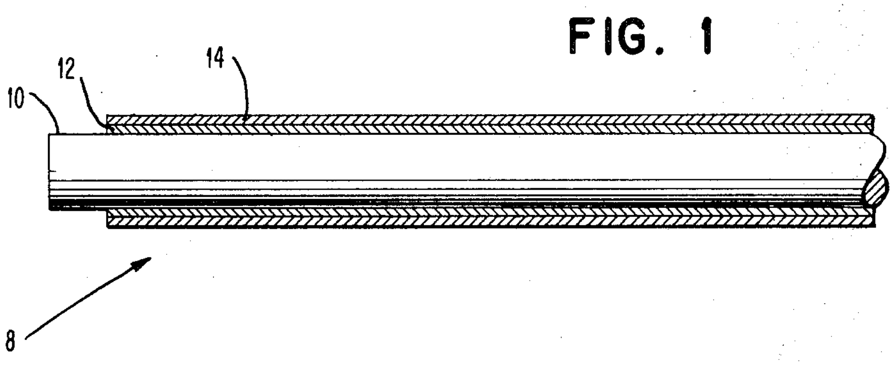
FIG. 2
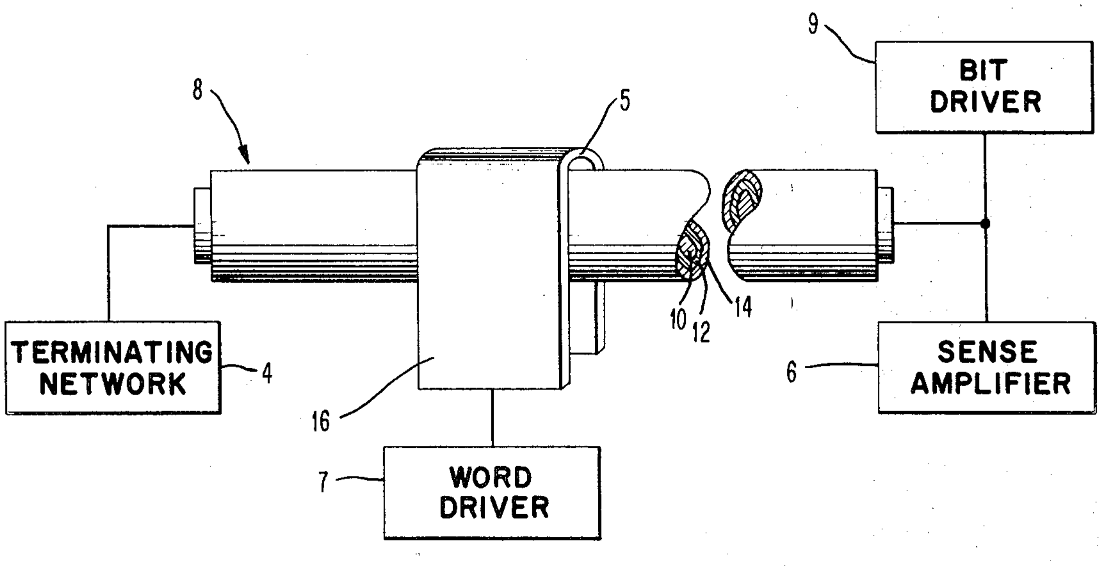
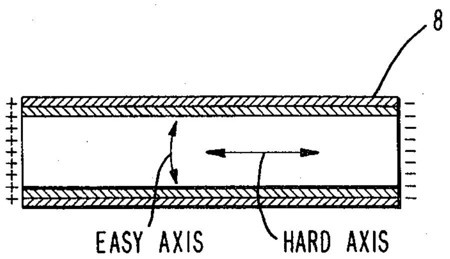
FIG. 3
INVENTOR
ALEXANDER TURCZYN
BY Rene A. Kuypers
ATTORNEY United States Patent Office 3,531,782
Patented Sept. 29, 1970

3,531,782

THIN FILM KEEPERED MEMORY ELEMENT

Alexander Turczyn, Philadelphia, Pa., assignor to Sperry Rand Corporation, New York, N.Y., a corporation of Delaware Filed May 26, 1965, Ser. No. 458,866
Int. Cl. G11c *11/14*
U.S. Cl. 340—174 6 Claims

ABSTRACT OF THE DISCLOSURE

A magnetic keeper is positioned around a small diameter wire. A magnetic coating which has the property of uniaxial anisotropy is plated over the keeper. A drive line juxtaposed and positioned orthogonally to the wire comprises a location whereat binary information is stored. The keeper plated directly on the wire provides a high permeability path for free magnetic poles formed during the read and write processes.

This invention relates in general to a memory element, and in particular relates to an improved thin film memory element.

It has been observed during the recording cycle of a computer incorporating a plated thin film, wire memory element (hereinafter referred to as plated wire) that axial fields emanating from the drive line (i.e., a drive solenoid) in conjunction with the digit field produced by the bit line causes an effect known as creep. Creep is defined as the gradual elongation of a magnetized section on a magnetic medium occurring during a computer recording cycle so that information stored in adjacent bit positions is destroyed or altered. The creep problem is particularly serious in the operation of a digital computer, since the latter functions by using discrete voltage pulses which have a particular polarity. It should be noted that the creep effect is more serious problem in plated wires than in planar film (i.e., a flat film formed on a substrate) elements since the plated wire utilizes a continuous magnetic medium, whereas the planar film employs discrete magnetic elements. In the event that the above-mentioned voltage pulses lose amplitude or are not well defined because of the above noted creep phenomenon, there is a tendency for the computer to produce spurious results and hence, lose accuracy. If the creep in a thin film memory device advances to a stage wherein it causes an adjacent bit position to be switched from a binary "1" into a binary "0," for example, a computer will definitely produce an erroneous result.

Therefore, it is an object of this invention to provide an improved data memory device.

It is a further object of this invention to provide an improved plated wire memory element.

It is yet another object of this invention to provide a technique that will minimize the effect of creep in magnetic thin film elements.

It is also a further object of this invention to provide a memory device which obtains greater packing density of the bits.

In accordance with the features of this invention, a thin magnetic keeper formed from a soft magnetic material (a material that is easily demagnetized) is formed around a small diameter wire. A magnetic coating which has the property of uniaxial anisotropy (i.e., the magnetic material is so thin that the magnetic movement prefers to lie in one of two equilibrium positions along an "easy" axis of magnetization) is then plated around the soft magnetic material to form a plated wire storage element. The plated wire storage element in combination with a drive solenoid positioned in juxtaposition and orthogonally thereto comprises a memory bit position which is adapted to store binary informatoin.

The plated wire storage element is characterized in that it has a closed flux structure (i.e., the flux path closes through the continuous magnetic material plated around the wire). However, when the thin film is switched (i.e., rotated from the "easy" toward the "hard" axis of magnetization) during a memory read or write cycle, the flux path becomes opened (i.e., the flux must close through the air and the wire). Since the air and the wire are low permeable mediums, there is a tendency for the flux path to spread along the plated wire so as to interfere with adjacent stored binary information. It is this phenomenon of the plated wire memory element which contributes to the creep effect during a write cycle so that eventually adjacent information is destroyed.

The soft magnetic material surrounding the wire substrate provides a high permeable material which causes the magnetic field to close therethrough rather than through the air or wire. In view of this expedient, the magnetic field does not spread during the switching process so that adjacent bit disturbance is minimized or virtually eliminated.

It is also a feature of this invention that for the same magnetizing field H, less current is required for a memory read and write cycle. Consequently, there is less adjacent bit interference because of the reduced current in the word lines.

The novel features that are considered characteristic of this invention are set forth with particularity in the appended claims. The invention itself, however, both as to its organization and method of operation, as well as additional objects and features thereof, will best be understood from the following description when considered in conjunction with the accompanying drawings, wherein:

FIG. 1 is a sectional view of the plated wire memory element in which the relationship of the wire, the soft magnetic material and the magnetic film is depicted;

FIG. 2 is an isometric view of a plated wire memory element incorporating a drive solenoid, wherein the intersection of the drive solenoid and the plated wire comprises a memory bit position;

FIG. 3 represents the magnetization vector orientation along the "easy" and "hard" axis of magnetization during a read or write memory cycle.

Referring now to FIG. 1, there is shown a sectional view of a copper-beryllium wire substrate 10 which in a particular embodiment is approximately five mils in diameter. The wire substrate 10 is continuously plated with a soft magnetic material 12. The soft magnetic material 12 which will be hereinafter referred to as a keeper is a material that is easily demagnetized. A demagnetized material, it is recognized, has an internal random domain distribution so that the specimen exhibits a "zero" net external magnetization. In other words, a soft magnetic material is one which does not retain any magnetization after the magnetization force is removed and is characterized by a linear as opposed to square B-H loop. On top of the keeper 12, there is plated a magnetic thin film coating 14.

The magnetic thin film coating 14 is electroplated on the keeper material 12 with approximately a 10,000 angstrom thickness of Permalloy film (i.e., nickel-iron alloy). In a particular embodiment, the Permalloy film has an approximate nickel-iron ratio of 80% and 20%, respectively. The Permalloy film is electroplated in the presence of a circumferential magnetic field that establishes a uniaxial anistropy axis at right angles (i.e., around the circumference) to the longitudinal axis of the wire along its length. The uniaxial anisotropy establishes an "easy" direction of magnetization and the magnetization vectors of the thin film are normally oriented in one of two equilibrium positions along the "easy" axis, thereby establishing two bistable states necessary for binary logic operation. By referring briefly to FIG. 3, the "easy" and "hard" axis of magnetization, the "hard" axis being 90° removed from the "easy" axis, are depicted by appropriate indicia. Returning again to FIG. 1, the wire substrate 10 together with the magnetic keeper 12 and the magnetic film 14 comprises a storage element 8 which is adapted to store binary information.

FIG. 2 depicts the storage element 8 in combination with a drive strap or drive solenoid 16. The storage element 8 is connected to the bit driver 9 and the sense amplifier 6. The drive strap 16 is connected to the word driver 7. The intersection of the storage element 8 and the word strap 16 represent a memory bit position 5. The bit position 5 represents a location where a binary "0" or binary "1" may be stored.

The word driver 7 and the bit driver 9, as well as the sense amplifier 6 cooperates for a read or write memory cycle in the following manner. Whenever a read cycle is required for a particular computer operation, the word driver 7 energizes the word strap 16. Current in the word strap 16 causes a magnetizing field to be generated which rotates the magnetization vectors at the bit position 5 (i.e., the magnetization vectors located along the "easy" axis) to some angle which is less than 90 degrees from the easy axis of magnetization. This rotation of the magnetization vectors at the bit position 5 induces a positive or negative polarity signal in the storage element 8, depending upon whether a binary "0" or binary "1" is recorded thereat, and this signal is detected by the sense amplifier 6.

During a memory write cycle, the word driver 7 cooperates with the bit driver 9 to record either a binary "0" or a binary "1" in the bit position 5. To record information in the bit position 5, the word driver 7 is again energized so that the magnetization vectors along the "easy" axis are rotated to a new position approaching the hard axis (i.e. a position which is less than 90 degrees from the "easy" axis) of magnetization. Simultaneously with the word strap 16 being energized, a steering current is applied to the storage element 8 by the bit driver 9. The current from the bit driver 9 causes the rotated magnetization vectors to be steered to the required orientation along easy axis direction. As briefly mentioned above, the particular orientation along the "easy" axis of the magnetization vectors determines whether a binary zero or one is stored at a certain bit location. The terminating network 4 is shown connected to the other side of the plated wire to indicate a complete circuit with the bit driver 9 or the sense amplifier 6. In most applications, the terminating network 4 represents ground potential.

As mentioned above, the traverse or axial magnetic field from the drive current in the word strap 16 during the write cycle of the memory in conjunction with the steering current from the bit driver 9 is the chief cause of creep in magnetically plated wires. In some cases, the creep effect requires millions of cycles or more. Thus, if the bit position 5 required a binary "1" to be written repeatedly therein, adjacent bit positions (not shown) which had binary "0" stored therein might be eventually switched into binary "1" over a period of time.

A close study of the bit position 5 in FIG. 3 reveals that in the unenergized position (i.e., when the magnetization vectors are located along the "easy" axis) the bit position has a closed magnetic flux path. In other words, the flux generated by the induced uniaxial anisotropy closes through the magnetic film 14.

As previously discussed, during a memory write cycle the magnetization vectors are rotated to some angle less than 90° (i.e., to an angle approaching the "hard" axis of magnetization). During the write process, free poles are created by the rotation of the magnetization vectors and are designated by the plus and minus signs along the "hard" axis. The reason for the creation of the free poles is that the closed flux path now becomes an open flux path. In other words, the free poles that are generated must utilize air or the wire substrate 10 as a medium to close the magnetic flux path. Air or copper are recognized as low permeable mediums. In the known type of prior art arrangement, the magnetic flux lines that emanate from the plus poles fringe into adjacent bit positions in attempting to close with the minus poles. Therefore, the air or copper-beryllium wire 10 does not provide a good transmission device for the magnetic field and consequently the field tends to spread from the bit position rather than to concentrate thereat. This spreading causes adjacent bit interference and creep.

The keeper 12 interposed between the magnetic film 14 and the copper-beryllium substrate 10 prevents spreading of the fringing magnetic field. The reason that the magnetic field does not fringe into adjacent bit positions is that the field emanating from the positive free magnetic poles reach the negative free poles through the low reluctance keeper 12. It should be recognized that the magnetic field prefers a path through the keeper 12 since it is a high permeable medium with respect to air or copper.

As a result of the expedient of interposing a soft magnetic keeper 12 between the wire substrate 10 and the magnetic film 14, the magnetic fields emanating from the free poles generated during the switching process (i.e., a memory read or write cycle) become concentrated at the bit position. Consequently, the creep effect during a memory write cycle is minimized or virtually eliminated.

The keeper 12 also prevents the spreading of the magnetic field emanating from the drive solenoid 16 during the read and write cycles. This results from the fact that less current is needed for the drive solenoid to produce the required orthogonal magnetizing force, H, during the read and write cycles. As a consequence, the bits (i.e., the locations where a binary "0" or "1" can be recorded) can be closely spaced along the storage element 8.

Obviously, many modifications and variations of the present invention are possible in light of the above teachings. It is therefore to be understood that within the scope of the appended claims, the invention may be practiced otherwise than as specifically described.

The embodiments of the invention in which an exclusive property or privilege is claimed are defined as follows:

1. A storage element comprising:
(a) an electrically conducting substrate;
(b) a keeper material covering said electrically conducting substrate;
(a) a magnetizable film covering said keeper material.

2. A storage element comprising:
(a) an electrically conducting substrate;
(b) a soft magnetic material covering said electrically conducting substrate;
(c) a magnetic film covering said soft magnetic material, said film having the property of uniaxial anisotropy.

3. A storage element comprising:
(a) a copper beryllium wire substrate;
(b) a soft magnetic material covering said wire substrate;
(c) a magnetic film covering said soft magnetic material, said film having the property of uniaxial anisotropy.

4. A memory device comprising:
(a) an electrically conducting substrate;
(b) a soft magnetic material covering said electrically conducting substrate;
(c) a thin magnetic film covering said soft magnetic material;
(d) a conductive drive line positioned in juxtaposition and orthogonal to said wire substrate.

5. A memory device comprising:
(a) copper-beryllium wire substrate;

(b) a soft magnetic material covering said wire substrate;
(c) a thin magnetic film covering said magnetic material, said magnetic film having the property of uniaxial anisotropy;
(d) a conductive drive line positioned orthogonally and in juxtaposition to said wire substrate.

6. A memory arrangement comprising:
(a) a metallic substrate;
(b) a first energizing means connected to said substrate;
(c) a soft magnetic material covering said metallic substrate;
(d) a thin magnetic film covering said soft magnetic material, said magnetic film having the property of uniaxial anisotropy;
(e) a conductive means positioned orthogonally and in juxtaposition to said substrate, the intersection of said film and said conductive line comprising a memory bit position;
(f) a second energizing means connected to said conductive means, information being recorded on said magnetic film by simultaneous application of said first and second energizing means, said high permeable material providing a low reluctance path for the magnetic fields generated at said bit position.

References Cited

UNITED STATES PATENTS

| | | | |
|---|---|---|---|
| 3,370,979 | 2/1968 | Schmeckenbecher ---- | 117—217 |
| 3,341,829 | 9/1967 | Meier -------------- | 340—174 |
| 3,414,891 | 12/1968 | Kohn -------------- | 340—174 |
| 3,395,403 | 7/1968 | Leesui Wu ---------- | 340—174 |
| 3,311,893 | 3/1967 | Landell ----------- | 340—172.5 |

OTHER REFERENCES

IBM Technical Disclosure Bulletin; Woven Wire Chain Magnetic Memory by R. P. Dingwall, vol. 8, No. 11, April 1966, pp. 1609–1610.

JAMES W. MOFFITT, Primary Examiner